United States Patent [19]

Johnson et al.

[11] Patent Number: 4,527,037
[45] Date of Patent: Jul. 2, 1985

[54] ELECTRODE DRIVE AND NOZZLE SYSTEM FOR AN AUTOMATIC AIR CARBON-ARC CUTTING AND GOUGING TORCH

[75] Inventors: David E. Johnson, Pataskala; Larry A. Aebersold; Kenneth E. McCall, both of Lancaster, all of Ohio

[73] Assignee: Arcair Company, Lancaster, Ohio

[21] Appl. No.: 487,351

[22] Filed: Apr. 21, 1983

[51] Int. Cl.³ .............................. B23K 9/16; B23P 1/06
[52] U.S. Cl. ....................................... 219/69 R; 219/70
[58] Field of Search ............... 219/68, 69 R, 70, 137.7

[56] References Cited

U.S. PATENT DOCUMENTS

| | | | |
|---|---|---|---|
| 2,433,018 | 12/1947 | Ronay | 219/70 |
| 3,131,290 | 4/1964 | Stepath | 219/130 |
| 3,317,779 | 5/1967 | Henderson | 314/5 |
| 3,659,071 | 4/1972 | Henderson | 219/69 |
| 3,735,085 | 5/1973 | McCall et al. | 219/70 |
| 4,260,867 | 4/1981 | Coughlin et al. | 219/70 |
| 4,300,033 | 11/1981 | Scarton et al. | 219/70 |
| 4,317,024 | 2/1982 | Moss | 219/70 |
| 4,464,555 | 8/1984 | Wallis | 219/70 |

FOREIGN PATENT DOCUMENTS 515946 12/1952 Belgium .......................... 219/138

Primary Examiner—C. L. Albritton
Assistant Examiner—Geoffrey S. Evans
Attorney, Agent, or Firm—James C. Simmons; E. Eugene Innis

[57] ABSTRACT

An automatic air carbon-arc cutting and gouging torch having a fixed drive wheel for moving an electrode through an insulated housing and through a nozzle adapted to conduct air in a semi-circular pattern along the electrode. Electrical current is supplied to the electrode through a contact shoe supported by and biased to the electrode by a lever arm, the shoe causing the electrode to frictionally engage the drive wheel. Alternately idler rollers can be used in combination with the contact shoe to position the electrode for movement by the drive wheel. Means are included to reposition the electrode in the event of electrode "stub-out".

9 Claims, 7 Drawing Figures

ELECTRODE DRIVE AND NOZZLE SYSTEM FOR AN AUTOMATIC AIR CARBON-ARC CUTTING AND GOUGING TORCH

TECHNICAL FIELD

This invention pertains to torches and in particular to automatic torches used in the Air Carbon-Arc Cutting and Gouging Process. In the Air Carbon-Arc Cutting and Gouging Process, an electrode is used to strike and maintain an arc between a workpiece causing melting of metal underneath the arc. As melting progresses, a stream of high-pressure air directed along the electrode to the arc causes the molten metal to be forcibly removed from the influence of the arc, thus leaving a groove or gouge, in the surface of the workpiece. The process can also be used to cut completely through the workpiece in the area traversed by the electrode and the arc. Torches for use in the Air Carbon-Arc Cutting and Gouging Process include an automatic torch wherein a torch is mounted on a carriage or other device for movement along a predetermined path. Automatic torches include means to feed electrodes toward the workpiece at a rate selected to match consumption of the electrode by the arc. Most automatic torches include provision for using jointed electrodes so that successive electrode lengths can be mated to, in effect, provide a continuous electrode of indeterminate length.

BACKGROUND OF THE PRIOR ART

Present automatic air carbon-arc torches are large and heavy in comparison to automatic welding devices thus requiring mounting to heavy duty travel systems and positioning devices. Moveover conventional devices have the majority of their exposed surfaces electrically conductive, require adjustment and/or part replacement when changing electrode diameters. The prior art devices encourage electrode breakage subsequent internal electrode jamming and electrode shorting to the case. Furthermore, electrical arcing of contact shoes is common and results in ruined work and premature failure of the torch parts.

One type of automatic Air Carbon-Arc Cutting and Gouging Torch is disclosed in U.S. Pat. No. 3,317,779. In this patent, rollers are used to frictionally engage the electrode and feed it through a nozzle containing a contact shoe which conducts electricity to the electrode. The nozzle has provision for directing air along the electrode to the arc and includes means for pivoting the housing support drive rolls having a fixed position relative to each other about an axis to, in effect, change the spacing between the rollers and increase frictional contact with the electrode.

Means for controlling the torch including the spacing of the torch to the workpiece and feeding of the electrode are disclosed in U.S. Pat. No. 3,659,071. This patent is an improved version of an automatic torch and control system.

Jointed electrodes for use in automatic torches are disclosed in U.S. Pat. No. 3,131,290.

Lastly, the current state of the art is reflected in the Model N automatic Air Carbon-Arc Cutting and Gouging Torch manufactured and sold by the Arcair Company of Lancaster, Ohio, and as shown in U.S. Pat. No. 4,260,867.

U.S. Pat. No. 4,300,033 discloses a device wherein the well known Coanda effect is used to entrain ambient air into the process air of a manual air carbon-arc cutting and gouging torch. The device of the '033 patent shows an annular flow of air completely surrounding the electrode which although creating less noise is wasteful of process air and does not remove slag well nor produce a quality groove.

Among the problems with the prior art torches is the problem of "stub-out" which, in turn, causes breakage of the electrodes. In most prior art devices internally of the automatic torch, the electrode is fixed between drive and idler rollers which are spaced apart from a pair of contact shoes which also serve to constrain movement of the electrode. If, when the torch is being used, the electrode is driven too close to the workpiece, it can actually contact the workpiece and cause a condition which is known as "stub-out". When this happens in prior art devices, a bending stress is placed on the electrode since it is fixed at two or more points inside the torch. This transverse load can cause breakage of the electrode where the electrode is constrained at the drive mechanism and at the shoe assembly, thus jamming the electrode inside the torch requiring the torch to be disassembled to extricate the broken electrode.

In prior art devices when the bending moment is applied to the electrode, arcing can occur between the electrode and the contact shoe causing a localized hardening of the contact shoe, the localized hardened spots on the contact shoe causing excessive wear of the electrodes subsequently used with the torch.

Furthermore, the prior art devices generally contain a very complex structure for effecting both the driving of the electrode and the carrying of current to the electrode via the contact shoes which support the electrode at a location spaced from the drive rolls.

SUMMARY OF THE INVENTION

In order to simplify the construction of an automatic Air Carbon-Arc Cutting and Gouging Torch, it has been discovered that a housing fabricated from an electrical insulating material can be used to support a motor which moves a drive wheel or roller positioned to frictionally engage an electrode for movement through an inlet and outlet aperture in the housing. A contact shoe carries electrical current to the electrode, while at the same time, through a biasing means is used to clamp the electrode to the drive wheel so that the drive wheel can move the electrode through the housing. Between the drive wheel and a nozzle fixed to the outlet of the housing, an electrode support and repositioning device is included which permits movement of the electrode out of the support and return to the support when "stub-out" occurs and the condition is subsequently alleviated. A new nozzle directs air in a semicircular pattern along the electrode to effect metal removal from the area of the arc, while at the same time reducing the operating noise of the torch by entraining ambient air into the process air stream by the well-known Coanda Effect.

DETAILED DESCRIPTION OF THE INVENTION

Figure 1:
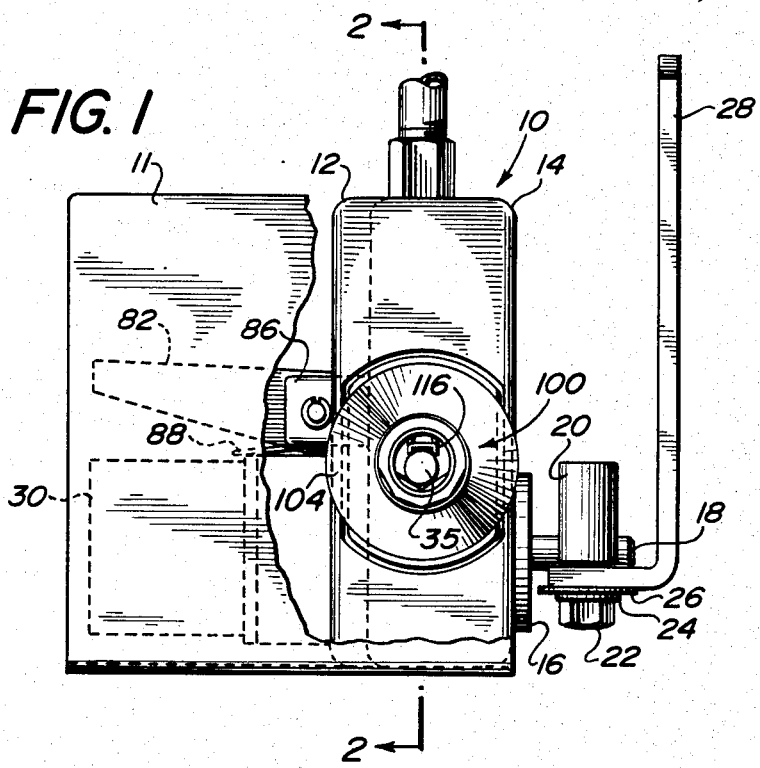
FIG. 1 is a front elevational view of an automatic Air Carbon-Arc Cutting and Gouging Torch according to the present invention.

Referring to the drawing and in particular to FIG. 1, the new automatic Air Carbon-Arc Cutting and Gouging Torch is shown generally as 10 and includes a housing 12 with a removable cover 14. Fixed to housing 12 is a radiation shield 11 which protects the torch from radiation provided by an arc stretched between electrode 35 and a workpiece (not shown). The housing 12 and the removable cover 14 are fabricated from an insulating material such as a high impact plastic or fiberglass reinforced plastic. Cover 14 includes a flange 16 which, in turn, has welded to it a pin 18 which receives a positioning screw 20 mounted through pin 18, the projection of screw 20 is adapted to position and fasten by means of nut 22 lockwasher 24 and washer 26, a mounting bracket 28. Mounting bracket 28 is utilized to mount the torch 10 to a carriage or other travel device (not shown) which can guide the torch head along a fixed path on a workpiece as is well known in the art.

Figure 2:
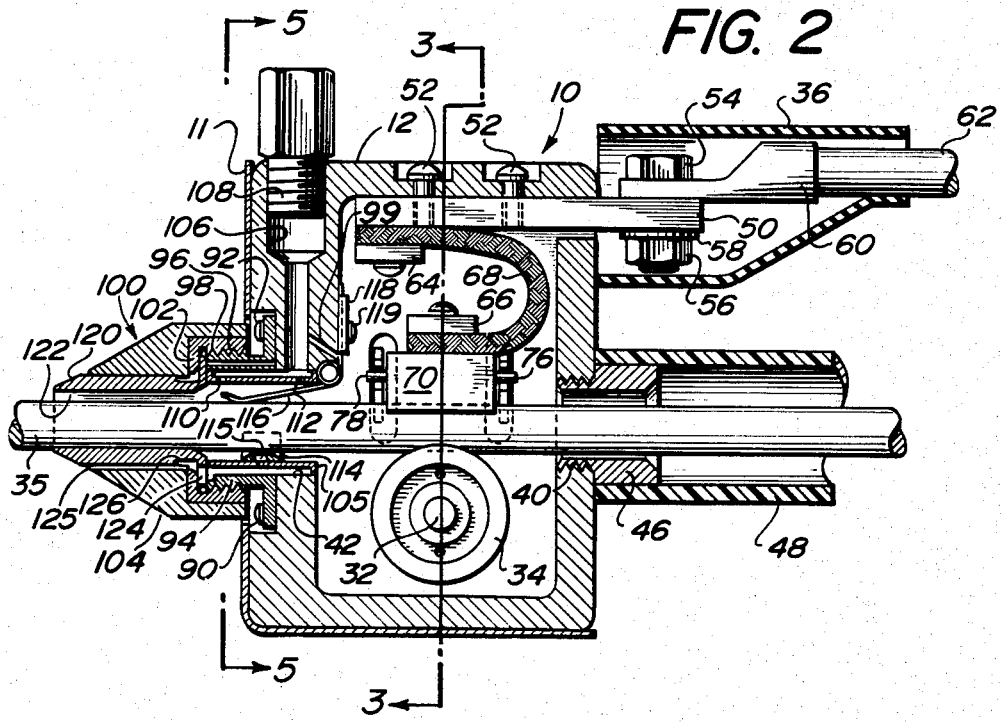
FIG. 2 is a section taken along the line 2—2 of FIG. 1.

As shown in FIG. 2, housing 12 is adapted to receive a motor assembly 30 which is mounted so that a shaft 32 projects interiorly of the housing 12 and has mounted thereon a drive roller or wheel 34. Drive wheel 34 can be a two-piece wheel having a V-shaped peripheral section with a knurled or roughened surface or a flanged wheel with teeth to frictionally engage an electrode 35 to drive the electrode through the housing 12 from inlet aperture 40 through outlet aperture or passage 42.

Inlet aperture 40 of housing 12 is threaded to receive an adapter 46 which, in turn, is utilized to position an elongated plastic electrode tube 48 to protect the portion of electrode 35 projecting from the inlet aperture of housing 12. Electrode holder tube 48 is fixed to adapter 46 by any convenient means such as a hose clamp (not shown).

Figure 3:
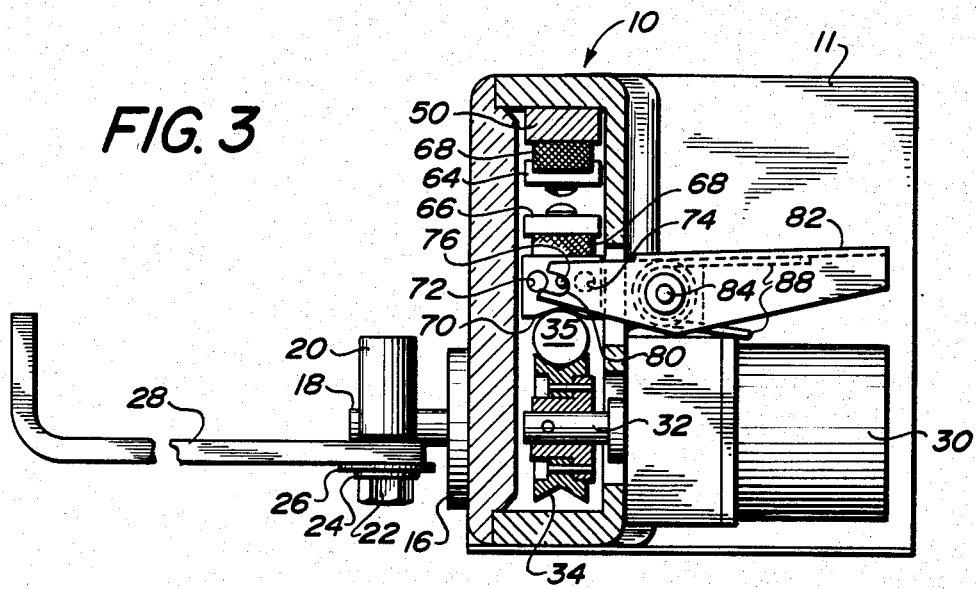
FIG. 3 is a section taken along the line 3—3 of FIG. 2.

In the upper portion of housing 12, a solid bus bar 50 of a conductive material such as copper is fixed to the housing by fasteners such as screws 52. Bus bar 50 is adapted by means of a bolt 54, nut 56 and lockwasher 58 to receive a connector 60 which, in turn, is fastened to a shielded electrical cable 62. A boot 36 of insulating material covers the connector 60 and bus bar 50 to prevent contact by the operator to parts that are outside the insulated housing 12. Bus bar 50 is, in turn, by means of an upper 64 and a lower 66 retainer and a flexible braided jumper 68 of a conductive material such as copper electrically connected to a contact shoe 70. Contact shoe 70 is adapted to contact electrode 35 to provide electrical current to electrode 35 and at the same time to urge electrode 35 into engagement with drive wheel 34 so that, as shaft 32 is rotated, the electrode can be driven through the housing 12. Contact shoe 70 includes a pair of longitudinal passages 72, 74 to permit air to circulate throughout the interior of housing 12. Shoe 70 includes a pair of projecting pins 76, 78 which are adapted to mate with a semi-eliptical receiver (e.g. 80 as shown in FIG. 3) in clamping lever 82.

Clamping lever 82 is pinned via an operating pin 84 to a pair of receivers, one of which is shown as 86 in FIG. 1, mounted on housing 12. Biasing means such as a spring 88 is used to urge the lever 82 to pivot about pin 84 so that the semi-eliptical aperture 80 is normally urged in a downward position, downward being defined as toward the bottom of the paper of FIG. 3. Thus, the shoe 70 is normally urged downwardly and would exert a clamping force on the electrode 35. If an operator wished to change the electrode, he would depress operating lever 82 which would raise the shoe from the electrode which then could be removed from the torch or, in the case of no electrode being in the torch, a new electrode inserted.

Fixed to the outlet aperture 42 and projecting therethrough of housing 12 by suitable fasteners such as screws or rivets 90 and 92 is an air plenum 94 having a generally cylindrical shape and having on its outside surface a series of threads 96 which receives complementary threaded portion 98 of the metallic portion of molded locknut assembly 100. Molded locknut assembly 100 consists of the metallic nut adapter 102 and an insulating conical-shaped cover 104. Disposed inwardly of the housing 12 and projecting outwardly of the exit aperture 42 is a sleeve nozzle 105 adapted to create a plenum chamber to receive air conducted into the housing through an air conduit 106 having a threaded portion 108 to receive a suitable air hose (not shown). Sleeve nozzle 105 contains ports or apertures 110 and 112 so that process air can be directed interiorly on the housing 12. Sleeve nozzle 105 contains a V-block or forward electrode support 114 which contains an aperture 116 vertically through the V-block and communicating with the plenum chamber defined by the sleeve nozzle 105 so that process air can be directed to the surface of the V-block which supporter electrode 35. V-block 114 is used to align the electrode 35 with the drive wheel 34. A biasing means such as a spring 116 is mounted interiorly of the housing by means of a nozzle spring retainer 118 and fastener 119. Spring 116 positions the electrode so it sits in the V but allows for movement of the electrode out of the V-block as will be discussed more fully hereinafter.

Figure 4:
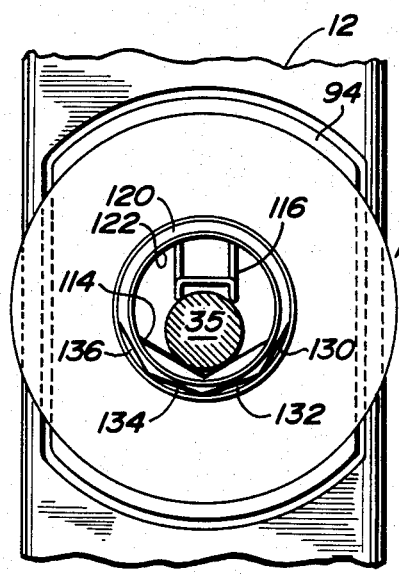
FIG. 4 is an enlarged fragmentary view taken along the line 4—4 of FIG. 2.

Molded locknut assembly 100 is adapted to position a nozzle 120 having a central aperture 122 so that the electrode can pass outwardly thereof without contacting the interior surface of the nozzle 120. Nozzle 120 is adapted by means of a suitable slot 124, and an annular chamber 126 to have air pass from the conduit 106 into plenum chamber defined by sleeve nozzle 105, housing 12 and air plenum 94, through the slot 124 and annular chamber 105 to be conducted outwardly of the nozzle 120 by a plurality of apertures 130, 132, 134 and 136 as shown more clearly in FIG. 4 one of which is shown as 125 in FIG. 2. As shown in FIG. 4, passages 130, 132, 134 and 136 are created by machining flats on one side of the exterior surface of the nozzle 120. The molded locknut assembly 100 in a tight fit against the nonflattened surfaces of nozzle 120 directs air only out of the enumerated passages so that air is directed in a semicircular (cross-section) path along the electrode. The outer surface of molded locknut assembly 100 is tapered so that, as the air exits through passages 130, 132, 134 and 136, air is entrained from the atmosphere into the process air by the well-known Coanda Effect. The entraining of air by the Coanda Effect serves to cut down the operating noise from the air component of the Air Carbon-Arc Cutting and Gouging Torch in operation.

Figure 5:
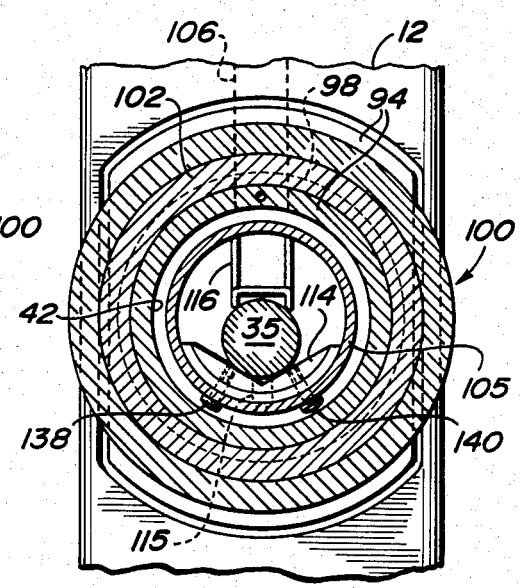
FIG. 5 is an enlarged fragmentary view partially in section taken along the lines 5—5 of FIG. 2.

FIG. 5 clearly shows the locknut assembly 10 and nozzle V-block or anvil 114, the air passage 115 and a pair of fasteners 138, 140 which can be used to fix the anvil 114 to the sleeve nozzle 105.

Figure 6:
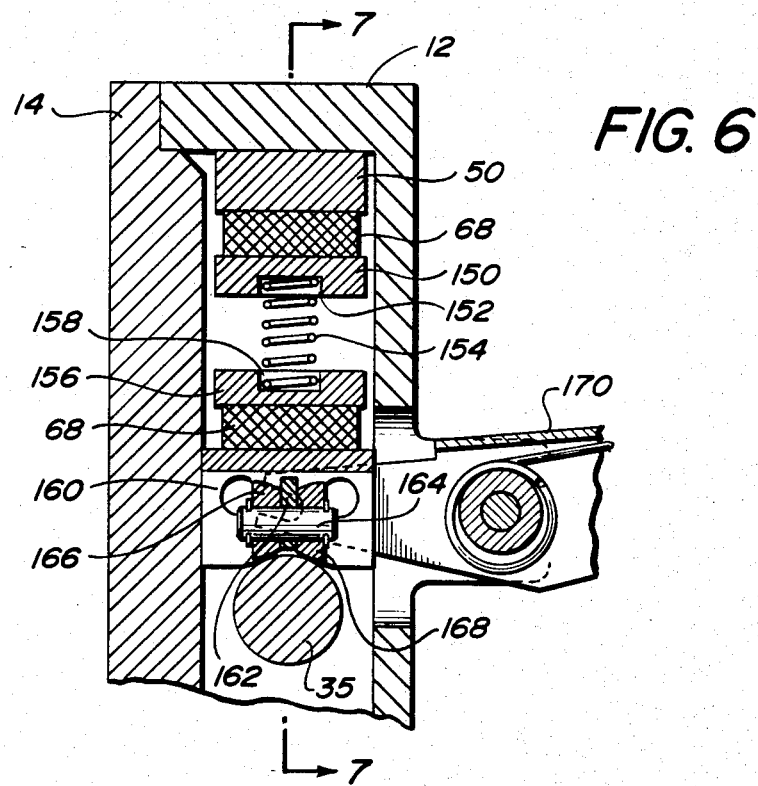
FIG. 6 is a fragmentary view partially in section illustrating an alternate electrode clamping means of the apparatus according to FIG. 1.

Referring now to FIG. 6, there is shown an alternate method of conducting electricity to the electrode while urging the electrode toward the drive wheel (not shown). The assembly of FIG. 3 shows the bus bar 50 and the braided jumper 68. The braided jumper 68 is fixed to the bus bar 50 by a first retainer 150 having a recess 152 for receiving one end of a biasing means such as spring 154. Second retainer 156 is of like configuration to first retainer 150 having a recess, groove or retainer aperture 158 to receive the other end of spring 154.

Figure 7:
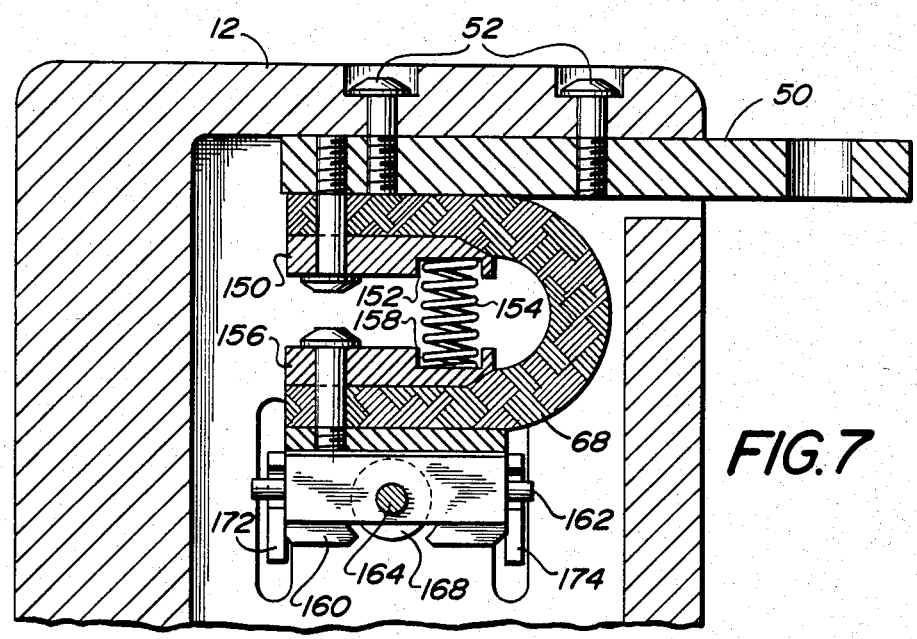
FIG. 7 is a view taken along the lines 7—7 of FIG. 6.

Disposed inside of shoe 160 is a crossbar 162 having lugs or bars which project beyond the extremities of shoe 160. Crossbar 162 has a pin 164 journaled to a pair of idler rollers 166, 168, which are adapted to contact electrode 35 to have a rolling frictional contact therewith in addition to the frictional contact of the shoe 160. As shown in the drawing when the lever arm or clamping lever 170 is depressed hooks or apertures 172, 174 engage the projections on crossbar 162 to raise the rollers from the surface of the electrode. Since the crossbar 162 is slidably mounted within shoe 160 and the rollers are not in contact with the shoe 160, as the crossbar 162 is raised, it eventually contacts a slot in the shoe 160 so that the shoe is also moved away from the electrode 35. The alternate embodiment shown in FIGS. 6 and 7 permits downward clamping force to be applied and greatly reduced rolling friction on the electrode 35. In one embodiment the shoe 160 straddles the rolls 166 and 168 at the electrode pivot point, but exerts a separate and reduced force and friction resulting from the spring 154 pressure. This assembly of parts allows the desirable ease of electrode loading since the shoe 160 and rolls 166, 168 all rise as a unit when lever arm 170 is depressed so that the lever arm 170 acts upon the crossbar 162 which lifts the shoe 160 by contact at the shoe slot's apex as well as lifting the rolls 166 and 168 via the axle 164.

In a further embodiment of the invention contact shoe 160 can be positioned forward of the center line defined by a perpendicular drawn vertically through the motor shaft 32 and the roller or idler wheels 166, 168 can be positioned at or slightly rearward of the center line so defined. With this arrangement if a successive electrode length is joined to the first and the joint is poor, current will be carried by the forward electrode thus preventing heat build-up inside the torch by increased resistance on the electrode. This will eliminate the possibility of combustion inside housing 12.

In operation an apparatus according to the invention is mounted to a suitable travel carriage device via bracket 28, the travel device being adapted to position the head relative to a workpiece and move the head along the workpiece in a prescribed path as is well-known in the art. A source of process air is connected to the conduit 106 via the threaded aperture 108 and a source of electrical current is conducted to the interior of the torch via electrical conduit 62, connector 60 and bus bar 50. The drive motor 30 is a geared stepping motor which receives an electrical signal and power from a suitable control panel such as sold by the Arcair Company under its part No. 72008012, thus causing the output shaft of the motor to rotate, rotating the drive wheel 34 which, in turn, moves the electrode 35 through the housing 12 from the inlet aperture 40 through the air nozzle 120. A sufficient clamping force is generated by the spring loaded lever assembly 82 and spring 88 producing friction between the drive wheel 34 and the electrode 35 to cause motion of the electrode.

Electricity for the process comes from a commercial welding power source and contacter such as sold by the Arcair Company as part number 72008013 and is connected to the bus bar 50 via connector 60 and cable 62. Electricity flows through the cable 62 to the bus bar 50 through the jumper 68 to the shoe 70 thus allowing current to flow to the electrode and finally to the workpiece through the process arc generated by the electrode.

Process air is conducted through conduit 106 to the plenum chamber defined by the sleeve nozzle 105 and housing 12 through the slot 124 and annular chamber 126 and out through the passages 130, 132, 134 and 136.

The electrode and internal parts of the torch 10 which are subject to overheating are cooled by air which passes from inlet conduit 106 through a pair of passages, one of which is shown as 99, through to the interior of the housing 12. The passages (e.g., 99) are positioned to direct air through the passages 72, 74 in shoe 70.

Electrode 35 is constrained from transverse motion by the drive roll 34 and by the spring 116 which exerts a force against the electrode pressing the electrode against the two angled surfaces of the V block 114.

It is desirable to reduce noise caused by the air carbon-arc cutting and gouging process for operator comfort, safety and health. However, process degradation or gouge quality should not be sacrificed. A device according to the present invention accomplishes both by entrainment of air from the ambient environment and by means of a specific air pattern in conjunction with the electrode. As shown in FIG. 4, air flow out of nozzle passages 132, 134 pushes molten metal forward of the arc and up and out of the formed groove. Air flowing out of passages 130 and 136 clears the molten metal from the sidewalls of the gouge being formed and prevents it from falling back into the groove thus assuring the operator of a smooth groove of uniform dimension with no adherence of molten metal. A nozzle such as described in U.S. Pat. No. 4,300,033 was fabricated and tested with the torch of the present invention. Gouge quality was inferior to that produced by the semi-annular nozzle of the present invention.

In the event the condition known as "stub-out" happens where the electrode 35 is driven into the workpiece, the electrode is free to pivot about the drive roller 34 thus moving the electrode out of the V block 114 to prevent undue bending of the electrode. As pointed out above this undue bending of the electrode in prior art devices has caused the electrode to snap interiorily of the torch since the electrode was constrained both at the drive rollers and at the contact shoe which was normally forward of the drive rollers. As the electrode is backed away from the workpiece, spring 116 causes the electrode to be repositioned in the V block thus maintaining the alignment of the electrode and minimizing electrode breakup due to the undesirable loading of the electrode during the "stub-out" phenomena. An air carbon-arc cutting and gouging torch according to the present invention has the possibility of significant weight reduction because the combined function of the drive wheel and the clamping with electrical conduction by means of the lever assembly and shoe. Thus the housing is required to contain fewer parts and can be of smaller volume than that of existing devices. Because the nozzle assembly does not conduct electricity to the electrode its parts are made of simpler and less massive design and can be made of less dense material. The shoe assembly including the jumper cable are of minimum dimensions to attain the required flexibility and operation at acceptable temperatures.

The housing and related parts such as the lock nut assembly 100 can be made of electrically insulating material such as plastic. The boot 36 can be made of a flexible insulating material such as plastic thus limiting the exposed conductive surface to the forward end of nozzle 120. It would be possible to make the nozzle 120 an insulator but this would increase the cost of the torch and in close proximity to the work and conductive electrode its value as an insulator is negligible.

A device according to the invention does not require the use of a multiplicity of shoes since the V block will accommodate many sizes of electrodes. Thus, in order to change the size of the electrode all one has to do is to press the lever and remove the electrode that's in the torch and substitute therefor the desired electrode. It is not necessary to change the shoe to accommodate this electrode nor the V block 114.

The phenomena of electrical arcing between the electrode and the current carrying shoe 70 is minimized by design. Specifically, the shoe 70 is not fixed to the housing but rather, by means of the clamping spring 88 which exerts a downward force on the shoe causes the shoe 70 to be held in intimate contact with the electrode at a location above the normal drive roll to permit the electrode to pivot during transverse and axial motion of the electrode.

Having thus described our invention what is desired to be secured by Letters Patent of the United States is set forth in the appended claims.

What is claimed:

1. In an automatic air carbon-arc cutting and gouging torch of the type adapted for positioning at a fixed position relative to a workpiece and having a means for supporting a consumable electrode juxtaposed to a workpiece, means for directing air along said electrode and means for continuously feeding successive jointed lengths of electrode to said workpiece as said electrode is consumed, the improvement comprising:

a housing fabricated from an electrically insulating structural material having an inlet aperture and an outlet aperture aligned therewith to permit electrode movement through said housing;

means mounted on said housing to cause rotation of a drive wheel adapted to frictionally engage said electrode and move said electrode through said housing;

an idler wheel assembly juxtaposed to said drive wheel and positioned by a clamping lever said lever having means to bias said idler wheel assembly toward said electrode to exert a heavy clamping force to maintain rolling function between said idler wheel and said electrode;

an electrical contact shoe mounted juxtaposed to said drive wheel, said contact shoe separately biased to said drive wheel whereby said biasing maintains said shoe in contact with said electrode with less force than said idler wheel biasing means to reduce sliding friction between said contact shoe and said electrode and adapted to be moved toward and away from said drive wheel by said clamping lever;

an electrode support positioned to support said electrode between said drive wheel and a nozzle assembly mounted in said outlet aperture of said housing said support including means to reposition said electrode to said support when said electrode is temporarily moved out of position on said support during operation of said torch; and a nozzle assembly including means to direct air in a semi-circular cross-sectional pattern along said electrode toward said workpiece;

whereby if said electrode is driven into said workpiece said electrode can pivot on said drive wheel and move out of said support to thus prevent breaking of said electrode inside said housing.

2. A torch according to claim 1 where the contact shoe is positioned forward of a center line drawn perpendicular to a center line of said drive wheel.

3. A torch according to claim 1 wherein the idler wheel assembly is positioned at the center line drawn perpendicular to the center line of said drive wheel.

4. A torch according to claim 1 wherein said means to bias said contact shoe includes a spring.

5. A torch according to claim 1 wherein said means to reposition said electrode to said support includes a spring.

6. A torch according to claim 1 wherein there is included means to conduct electricity from a power source to said contact shoe said means including a bus bar projected through said case and a flexible electrical jumper between said shoe and a portion of said bus bar inside said housing.

7. A torch according to claim 1 wherein said housing includes means to mount said torch to a travel carriage.

8. A torch according to claim 1 wherein there is included means to conduct air to said nozzle and inwardly of said housing to cool said housing during operation of said torch.

9. A torch according to claim 1 wherein the idler wheel assembly is positioned rearwardly of the center line drawn perpendicular to the center line of said drive wheel.

* * * * *